(12) United States Patent
Lagardere

(10) Patent No.: US 6,510,815 B1
(45) Date of Patent: Jan. 28, 2003

(54) METHOD FOR FEEDING AQUATIC ANIMALS

(75) Inventor: Jean-Paul Lagardere, Saint Xandre (FR)

(73) Assignee: Centre National de la Recherche Scientifique (CNRS), Paris Cedex (FR)

( * ) Notice: Subject to any disclaimer, the term of this patent is extended or adjusted under 35 U.S.C. 154(b) by 0 days.

(21) Appl. No.: 09/744,817

(22) PCT Filed: Jul. 29, 1999

(86) PCT No.: PCT/FR99/01877

§ 371 (c)(1),
(2), (4) Date: Feb. 16, 2001

(87) PCT Pub. No.: WO00/05944

PCT Pub. Date: Feb. 10, 2000

(30) Foreign Application Priority Data

Jul. 30, 1998 (FR) .............................................. 98 09768

(51) Int. Cl.⁷ .............................................. A01K 61/00
(52) U.S. Cl. ............................................................ 119/230
(58) Field of Search .................................. 119/230, 212, 119/242

(56) References Cited

U.S. PATENT DOCUMENTS

| 4,237,820 A | * | 12/1980 | Muller ......................... 119/51 |
| 4,297,973 A | * | 11/1981 | Knowles ........................ 119/3 |
| 5,133,287 A | * | 7/1992 | Hicks ............................. 119/3 |
| 5,291,858 A | * | 3/1994 | Patrick et al. ............... 119/230 |
| 5,320,068 A | * | 6/1994 | Redditt ....................... 119/226 |
| 5,337,698 A | * | 8/1994 | Widmyer ................. 119/51.04 |
| 5,636,595 A | * | 6/1997 | Lunde et al. ............... 119/224 |
| 5,730,086 A | * | 3/1998 | Truebe ....................... 119/219 |

FOREIGN PATENT DOCUMENTS

| JP | 09 329482 | 12/1997 |
| JP | 10 313730 | 12/1998 |
| WO | 92 12628 | 8/1992 |
| WO | 96 15663 | 5/1996 |

OTHER PUBLICATIONS

Patent Abstracts of Japan, vol. 98, No. 4 (1998).

Patent Abstracts of Japan, No. 3, (1999).

* cited by examiner

*Primary Examiner*—Thomas Price
(74) *Attorney, Agent, or Firm*—Foley & Lardner

(57) ABSTRACT

The invention concerns a method for feeding aquatic animals comprising a step which consists in distributing the food, characterized in that it further comprises a step which consists in automatically controlling the food distribution by measuring sound signal characteristic of the feed intake, that is, emitted by the animals corresponding to their ingestion or attempt to ingest food.

17 Claims, 4 Drawing Sheets

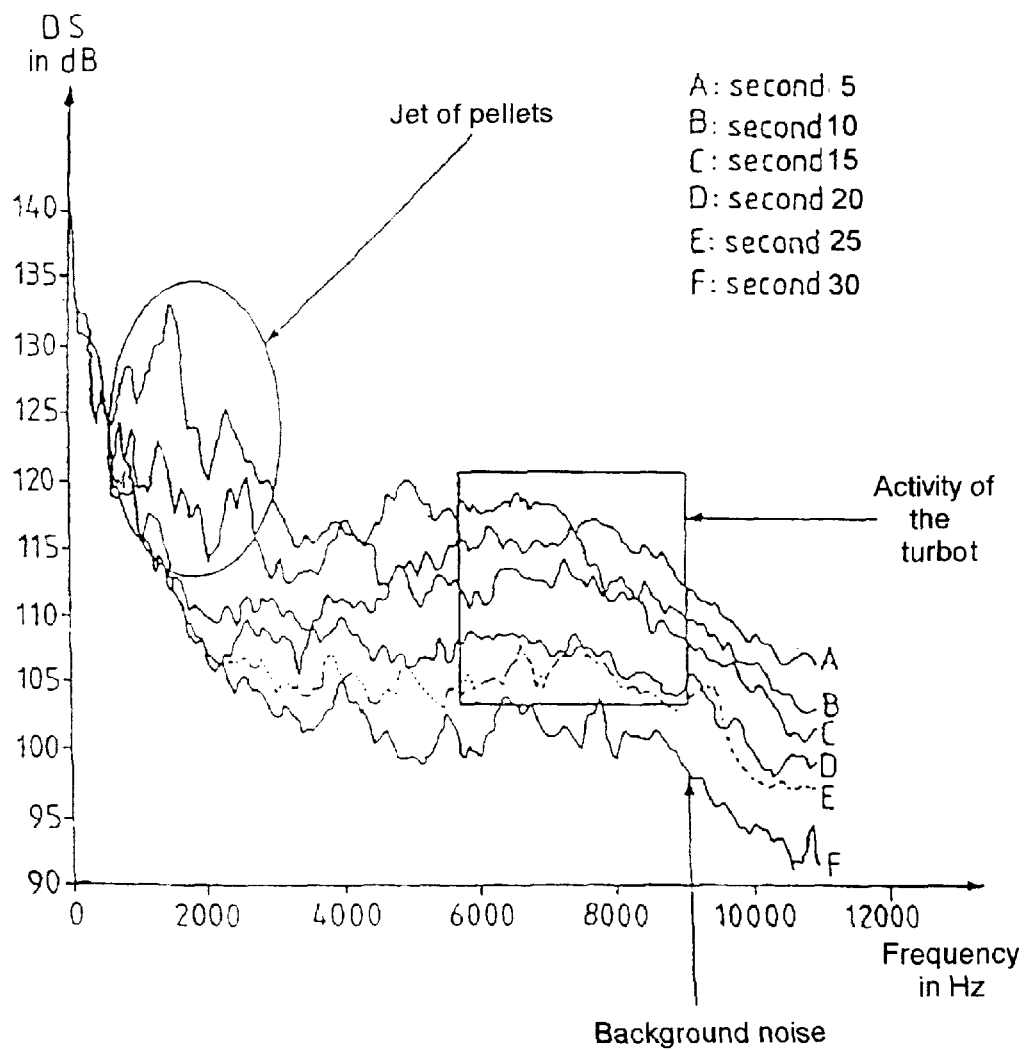
FIG_1

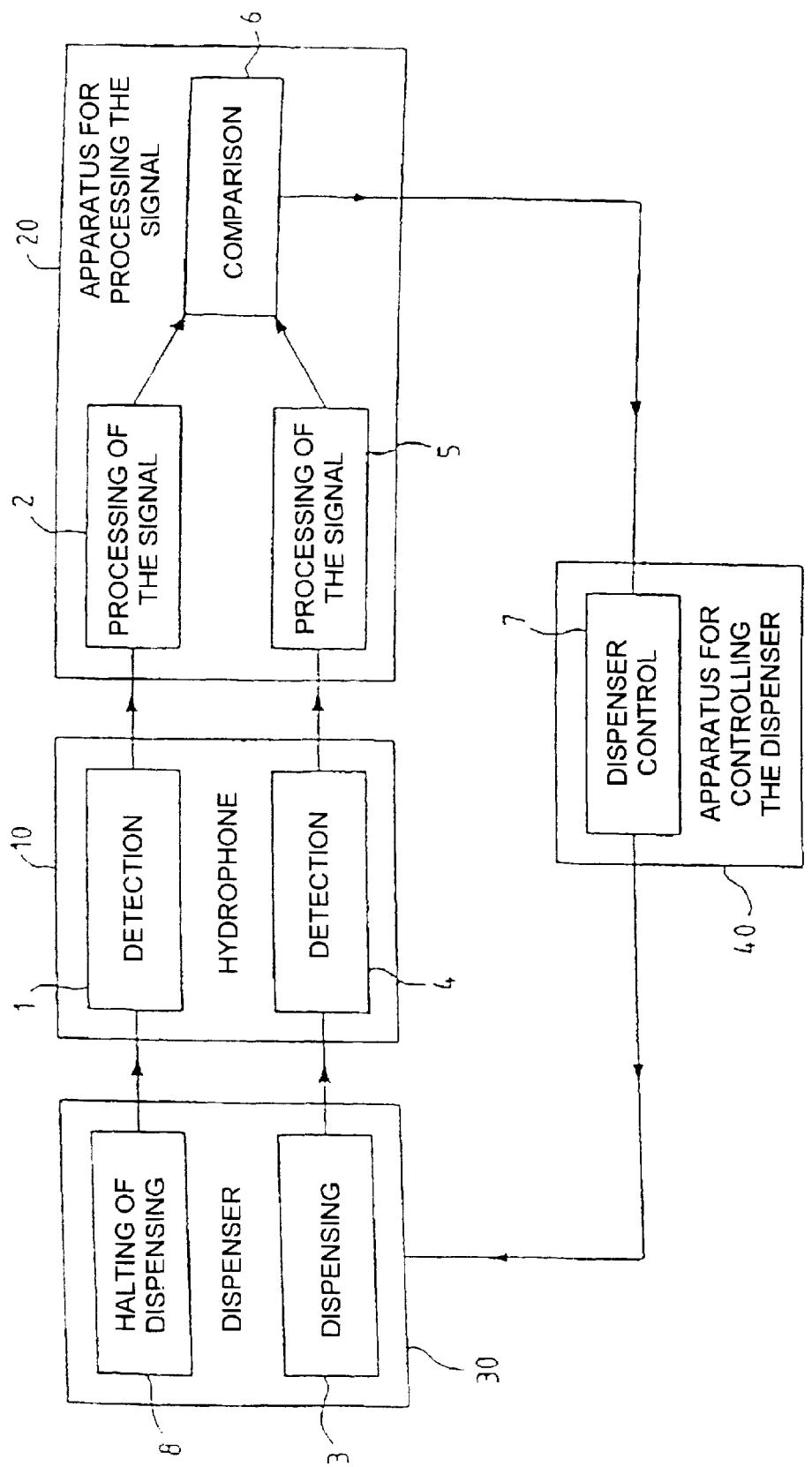
FIG_2

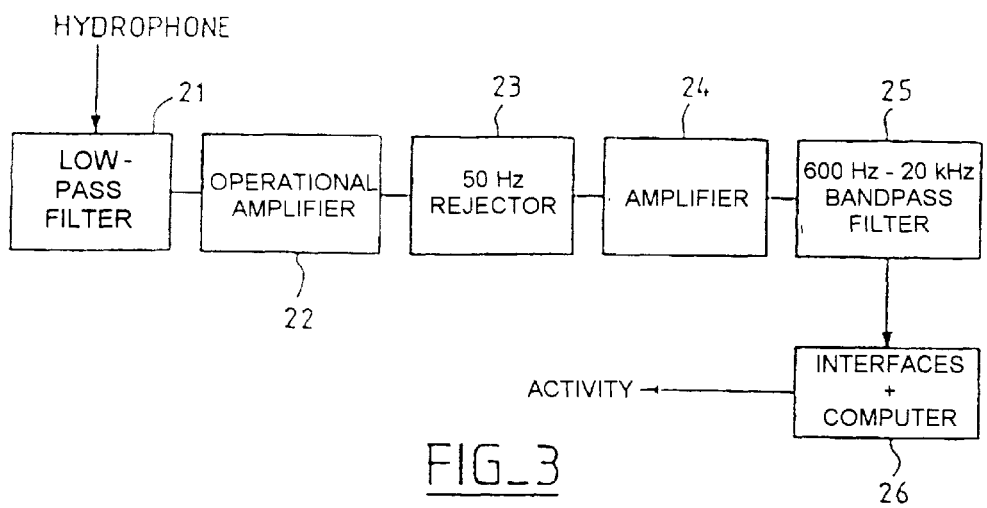
FIG_3
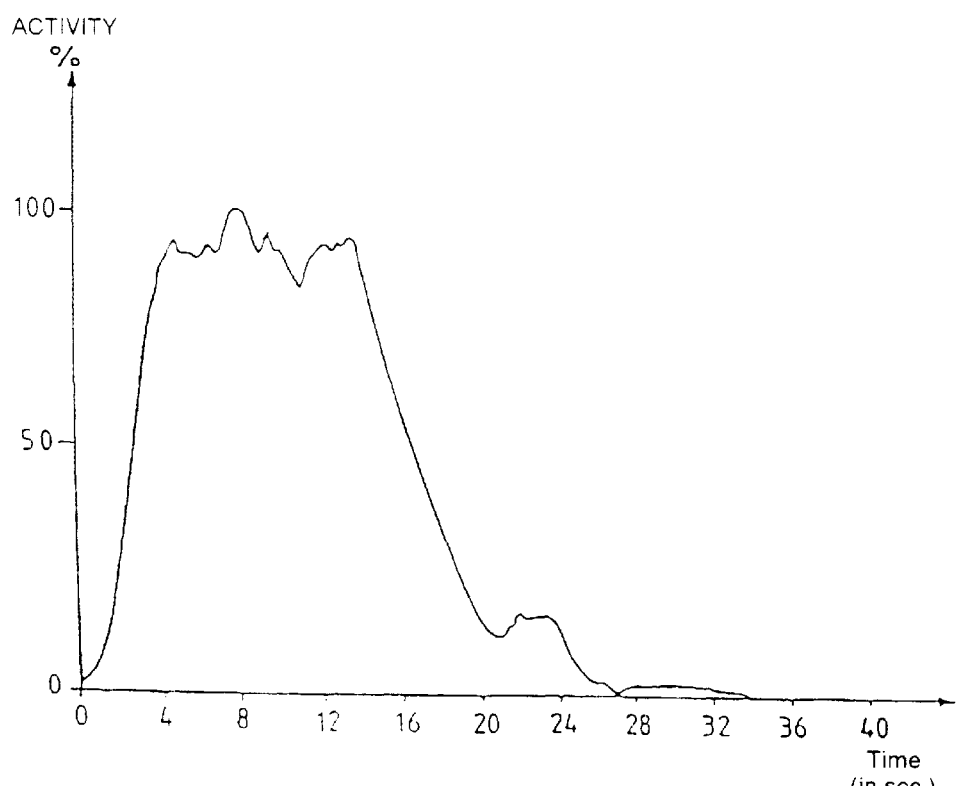
FIG_4

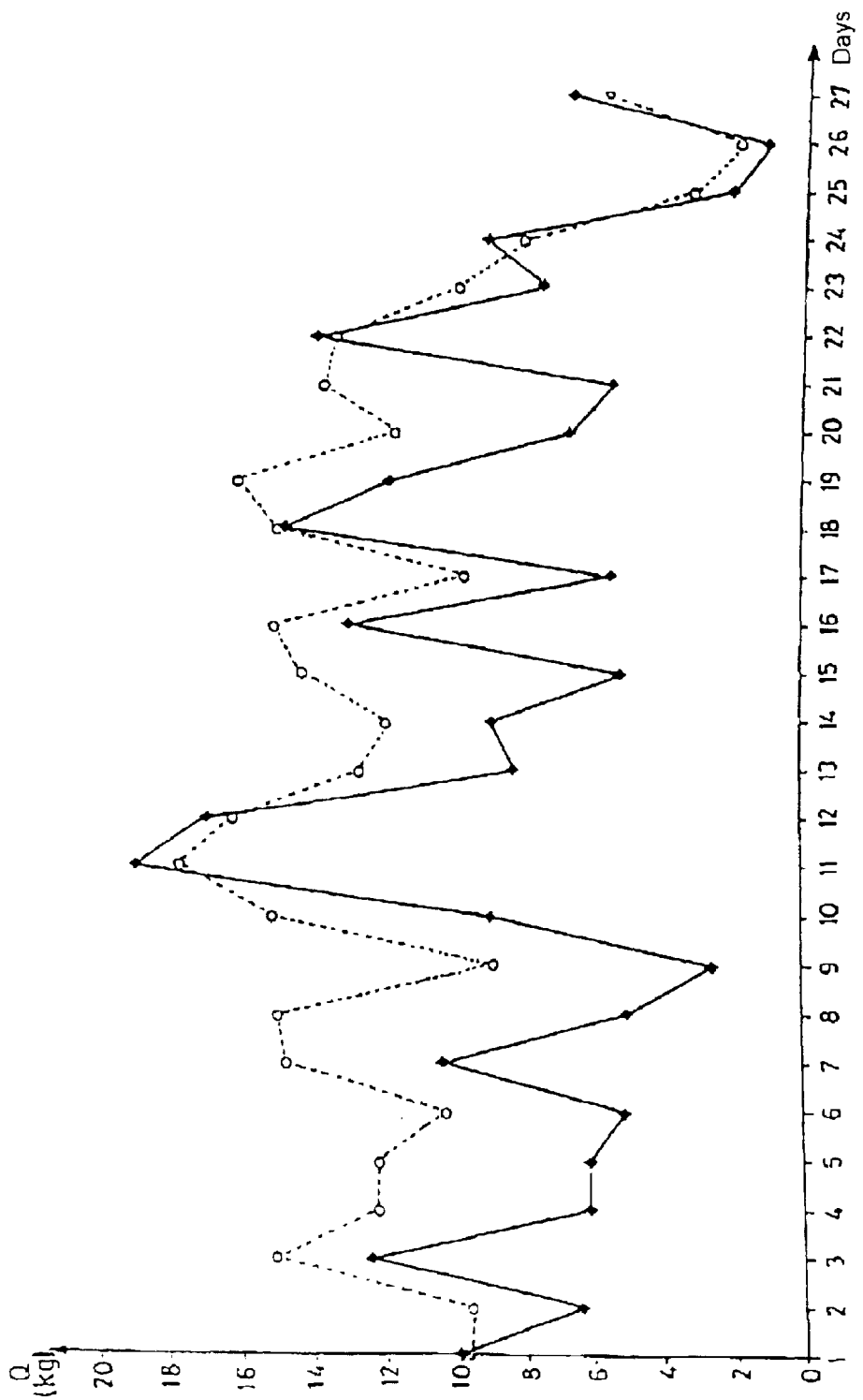
FIG_5

METHOD FOR FEEDING AQUATIC ANIMALS

TECHNICAL FIELD

The invention relates to the field of aquaculture. More precisely, it concerns a feeding process for aquatic animals, such as fish. More precisely still, it concerns a process for adjusting the supply of feed to these aquatic animals, as a function of their food requirements.

BACKGROUND ART

Several types of processes aimed at regulating the supply of feed to fish as a function of their requirements are already known.

According to one of these types, the dispensing of feed is carried out in accordance with rationing tables or charts, which indicate the food requirements of the fish. However, this type of method does not take into account the variations in the food-related behavior of the fish which may depend on numerous factors, such as the temperature, their state of stress, the oxygen content of the water, etc.

According to a second type, the dispensing of food is based on the demand of the fish by virtue of a system invoked directly by the latter when it is hungry, for example by snout blows on a tactile rod. However, the invoking of the tactile rod may occur through play or by accident related to the considerable density of fish in the vicinity of the rod.

According to a third type, the farmers determine by visual observation whether or not the fish are feeding and condition the dispensing of feed on this observation. However, it is not easy to determine visually whether the fish is eating, for several reasons:

- firstly the large number of fish per tank sometimes prevents sight of the pellets in the water;
- the quality of the water is not always the same: once the water becomes hazy it is very difficult to observe the fish;
- in the case of benthic fish, that is to say fish which tend to remain on the bottom, they do not always come to the surface to take the pellets.

According to a fourth type, described by document WO/92 12 628 A, the monitoring of the feeding of fish is carried out by virtue of a sonar with echo on the particles of feed falling below a surface zone and then regarded as not ingested by the fish. This system can only be used for surface-feeding fish.

Moreover, it requires a water height of several meters, this being scarcely compatible with the use of processes of this type in artificial concrete tanks.

According to a fifth type, described by document WO 96/15 663, the monitoring of the feeding of fish is also carried out by virtue of a sonar with echo on the particles of feed, with measurement of the Doppler effect of the sinking food particles.

According to a sixth type described by the document Database WPI, XP 00209 7799, the monitoring of the feeding of fish is carried out by virtue of a measurement of the swimming activity of the fish (excitation and acceleration so as to catch the food, but which may however not correspond solely to feeding activity). This activity measurable between 100 and 1000 Hz does not always make it possible to circumvent spurious noise, in particular in an artificial environment and/or when using pellets rather than soft food.

BRIEF SUMMARY OF THE INVENTION

An aim of the invention is to provide a process for tailoring the dispensing of food to fish, to its actual consumption by the fish, which does not exhibit the drawbacks of the prior art processes mentioned above.

This aim is achieved by virtue of a process for feeding aquatic animals comprising a step of dispensing feed, characterized in that it furthermore comprises a step of slaving the dispensing of feed to the measurement of an acoustic signal characteristic of the food uptake, that is to say, emitted by these animals and corresponding to their ingestion or attempted ingestion of food.

Such a food uptake signal indicates that the fish are actually feeding. The measurement of this signal, for example the measurement of its amplitude, gives a high result when numerous fish are feeding. The result of this measurement decreases when the feeding fish are less numerous.

The slaving of the dispensing of feed to the result of this measurement therefore makes it possible to tailor the dispensing to the actual requirements and thus to avoid waste, doing so without penalizing the demand expressed by the fish.

The process according to the invention exhibits, as compared with the prior art, the following advantages:

- it is based solely on the noise of aspiration of a food pellet by the fish; it is therefore a transient emission source formed of a series of brief pulses (5 to 10 ms) whose number is proportional to the number of fish seizing pellets; this aspiration noise which may be likened to a crackling, excites a very wide frequency band from 1000 to 20,000 Hz, or even beyond;
- it uses the frequency band from 6 to 9 kHz as the active listening band; this choice makes it possible to circumvent two types of sound pollution frequent in breeding farms: the noise from the surroundings of a concrete tank breeding farm (aerators, pumps, overflows, etc.) and the impact noise of the pellet on the surface of the water;
- it is therefore adapted to concrete tank farming systems and to all species which capture their prey by aspiration; and
- it avoids recourse to listening to swimming noises since they are practically indiscernible under intensive farming conditions on land, and more generally, since they are not strictly indicators of an actual food uptake.

Other aspects, aims and advantages will become apparent on reading the detailed description which follows. The invention will also be better understood with the aid of the drawings in which:

DESCRIPTION OF FIGURES

FIG. 1 is a graphical representation of the Fourier transforms of acoustic signals recorded in a turbot farming tank;

FIG. 2 represents an overall diagram of the various steps of an exemplary implementation of the process according to the invention;

FIG. 3 diagrammatically represents the chain for processing the signal measured during the implementation of a particular exemplary process according to the invention;

FIG. 4 represents the activity of the food uptake of turbot, measured as a function of time, by virtue of a process in accordance with the present invention; and FIG. 5 represents the profile, over a month, of the daily supplies of food according to a feeding process in accordance with the present invention and according to a traditional feeding process.

DETAILED DESCRIPTION OF THE INVENTION

The invention is described hereinbelow in its use, particular but not limiting, in respect of the feeding of turbot (Scophtalmus Maximus) in fish-raising farms.

In farms of this type, the fish are fed by the dispensing of pellets.

B. Bordeau ("Influences de l'environnement acoustique sur les poissons marins et continentaux—Applications aux pêches" [Influences of the acoustic environment on marine and continental fish—Applications to fishing], Pre-doctoral thesis, Université Paris VI, 1982) describes numerous cases of fish which emit acoustic signals when they are eating pellets, either through masticatory stridulation, or seizure clicking.

These acoustic signals have frequencies which generally lie between 1 and 10 kHz. More precisely, in the case of turbot, it has been observed by the Applicant that large turbot emit these signals, characteristic of their food uptake, between 2 and 10 kHz, whilst the small ones emit them rather between 3 and 9 kHz. It has also been observed by the Applicant that the amplitude of these signals varies as a function of the number of fish feeding.

The process according to the invention can comprise several preliminary steps.

These preliminary steps may for example be:
- a step of determining the frequency band in which the dynamic range of the signal is best throughout the duration of detection; this is because, on the one hand, this frequency band depends on the type of aquatic animal forming the subject of the farming, the conditions of farming, etc., and on the other hand, the signal decays over time and excites an ever more restricted frequency band;
- possibly also, a step consisting in verifying that the density of fish in a tank does not influence the frequency of the noise generated by the individual food uptake and does not modify the food uptake signal referred to a single fish; and
- a step of determining the threshold amplitude of the acoustic signal, below which it may be regarded that these aquatic animals are fed sufficiently to halt their feeding.

The determination of the frequency band in which the fish emit an acoustic signal during their uptake of food can be carried out by measuring the acoustic signal as a function of time, in a farming tank over a period of time during which the fish are feeding, then by producing a first Fourier transform of this signal. Spikes then appear in the Fourier transform. To identify the nature of these spikes, the same measurement can be repeated while the fish are not feeding. By producing a second Fourier transform of this signal and by comparing the two Fourier transforms, it may be deduced that the spikes which have disappeared in the second Fourier transform correspond to the characteristic noises of the food uptake of the fish. The bubbling into the tank may possibly be halted during measurements of this type so as to identify the range of frequencies which are disturbed by this method of aeration. An example of such Fourier transforms is illustrated by FIG. 1. This figure represents the amplitude DS (spectral density) of the Fourier transforms as a function of the frequency of the various signals recorded at different moments of the feeding. The dispensing of the pellets lasts about 10 seconds (curves A and B). Thirty seconds after the start of feeding, virtually all the fish have stopped feeding (curve F). Background noise alone is then observed. In addition to the large dynamic range in the neighborhood of 1 to 2 kHz which corresponds to the noise of impact of the pellets on the water, a large dynamic range is observed between 6 and 9 kHz. This frequency span corresponds to the noises generated by the food uptake activity of the turbot.

After these preliminary operations, a routine implementation of the process according to the invention can begin.

FIG. 3 illustrates, through a general diagram, the set of routine operations of an exemplary implementation of the process according to the invention.

According to this exemplary implementation of the process according to the invention, the process can comprise several steps following one another chronologically in the manner described hereinbelow.

A first step 1 consists in performing a detection of the background noise of the fish farming tank, with the aid of a hydrophone 10, over a time interval during which the dispensing of feed is halted.

A second step 2 consists in processing this signal corresponding to the background noise with the aid of an apparatus for processing the signal 20.

A third step 3 consists in triggering the dispensing of the feed to the fish with the aid of a dispenser 30.

A fourth step 4 consists in detecting the signal of the food uptake of the fish, with the aid of the hydrophone 10.

A fifth step 5 consists in processing this food uptake signal, with the aid of the apparatus for processing the signal 20.

A sixth step 6 consists in comparing the food uptake signal with the signal originating from the background noise with the aid of the apparatus for processing the signal 20.

A seventh step 7 consists in automatically controlling the dispensing 30, with the aid of an apparatus for controlling a dispenser 40, as a function of the ratio of the food uptake signal to the background noise, determined by the apparatus for processing the signal 20.

An eighth step 8 consists in halting the dispensing of feed by the dispenser 30, when this ratio of the food uptake signal to the background noise lies below a threshold amplitude.

Preferably, the second and fifth steps 2 and 5 for processing the signal originating from the hydrophone consist in subjecting this signal to the set of operations represented in FIG. 3.

A first low-pass filter 21 is essential in order to remove from the signal certain very low frequency components, such as the straightforward motion of the water (swell) which would saturate the step of amplification upon entry of the signal.

An impedance matching by virtue of a first operational amplifier 22 is required so as not to disturb the signal originating from the hydrophone, with the remainder of the elements of the amplification chain.

A fifty Hertz rejector 23 may be useful for purifying the signal of the spurious glitches originating from electric machines present in the environment of the measurement.

An amplifier 24 then makes it possible to amplify the signal to be measured, before isolating within the acoustic spectrum that part containing the frequencies characteristic of the food uptake, by virtue of a 600 Hz–20 kHz bandpass filter 25, for example.

A system 26 composed of a computer and of the necessary interfaces makes it possible to carry out digital processing of the signal originating from the hydrophone 10 and to average this signal. Specifically, the measured signal corresponds to the instantaneous activity of the fish and exhibits many variations. Since the calculation of this average takes time, it is necessary not to overly increase the number of instantaneous values used to perform it, since a temporal offset ensues which delays the decision regarding the halting of the dispensing of feed. The amplitude of the acoustic signal, measured during the dispensing of feed and averaged, is compared with the amplitude originating from the background noise, so as to calculate the food uptake activity of the fish. This background noise, conversely, is measured over a time interval during which the dispensing of feed is halted, for example, in the course of steps 1 and 2, prior to the start of feeding. The food uptake activity is then represented by a relative percentage. An exemplary graphical representation of this activity during a feeding session from a fish farming tank is given in FIG. 4.

When the activity decays below a threshold value, a command is sent to the control apparatus 40 of the dispenser 30 so that the latter halts the dispensing of feed.

These latter steps 7 and 8 may be replaced by manual control. Specifically, the apparatus for processing the signal 20 can be furnished with an indicator, visual or audible for example, of the activity which enables the farmer to himself halt the dispensing of food.

FIG. 5 shows the profile over a month of the daily quantities Q of feed dispensed to turbot in a farming tank, according to a traditional feeding process (curve a) and according to a process in accordance with the invention (curve b). The traditional feeding process used here consists in dispensing feed manually while observing the food uptake of the fish and halting the dispensing when the food uptake is estimated visually to be low enough. The feeding process according to the invention, as used here, also consists in dispensing feed manually, but in halting the dispensing when an alarm is triggered by the apparatus for processing the signal 20 at the moment at which the food uptake activity of the fish passes below the threshold value.

The use of the process according to the invention has made it possible, in the case illustrated by FIG. 5, to make a saving of 25% as compared with the quantity Q of feed dispensed traditionally.

In the above-described exemplary process according to the invention, the slaving step consists in measuring the amplitude of the signal during the step 3 of dispensing acoustic feed and in ending this step 3 when the amplitude of the acoustic signal passes below a threshold amplitude determined so as to economize on the quantity of feed without penalizing the food demand expressed by the fish. However, numerous other variants may be envisaged.

Thus, instead of measuring the amplitude of the acoustic signal, it is possible to detect the acoustic signature of the food uptake. Instead of an amplitude detector such as that described hereinabove, it is possible to use an acoustic signature detector. This detector can use spectrum comparison methods or signal processing methods derived from those employed in voice recognition, and based on statistical approaches. Among these types of approaches are included solutions based on neural networks or hidden Markov models.

In the case in which an acoustic signature detector is used, the slaving step consists in effecting a detection of the acoustic signature of the food uptake so as to determine the number of fish feeding during the feed dispensing step and in ending this step, when the number of fish feeding, thus determined, passes below a threshold number determined so as to economize on the quantity of feed dispensed, without penalizing the food demand expressed by the animals.

The process can also be used in the slaving of the food uptake, by automatic halting of the latter, for species of fish farmed in submerged offshore cages, or in floating cages with food dispensing by pulsed air, or for all intensive farming plants using recycled or non-recycled water.

The process can also serve for an acoustic detector making it possible to verify the ingestion of pellets with antibiotics during treatments of certain diseases.

According to another process for implementing the process according to the invention, the instantaneous quantity of feed dispensed can also be correlated directly with the instantaneous amplitude of the food uptake activity of the aquatic animals.

According to yet another variant, the process in accordance with the present invention comprises a step consisting in discriminating the signals generated by animals of different weights.

What is claimed is:

1. A process for feeding aquatic animals comprising:
   (a) dispensing feed;
   (b) slaving said dispensing of feed to a measurement of an acoustic signal characteristic of food uptake by said aquatic animals and wherein said acoustic signal
      (i) is emitted by said aquatic animals; and
      (ii) corresponds to ingestion or attempted ingestion of food by said aquatic animals.

2. A process according to claim 1, further comprising:
   (c) determining a threshold amplitude of said acoustic signal, below which said aquatic animals have been sufficiently fed to halt said feeding.

3. A process according to claim 2, further comprising:
   (d) measuring an amplitude of said acoustic signal during said dispensing; and
   (e) ending said dispensing when said amplitude of said acoustic signal passes below said threshold amplitude thereby minimizing the amount of feed dispensed without penalizing food demand expressed by said aquatic animals.

4. A process according to claim 1, further comprising:
   (f) determining a frequency band in which a dynamic range of said acoustic signal is optimal.

5. A process according to claim 1, further comprising:
   (g) filtering said acoustic signal with a bandpass filter to isolate part of an acoustic spectrum comprising frequencies characteristic of food uptake.

6. A process according to claim 1, further comprising:
   (h) measuring an amplitude of background noise over a time interval during which said dispensing is halted; and
   (i) comparing an amplitude of said acoustic signal measured during said dispensing of feed with said amplitude of said background noise.

7. A process according to claim 1, further comprising:
   (j) correlating an instantaneous quantity of feed dispensed with an amplitude of an instantaneous activity of food uptake of said aquatic animals.

8. A process according to claim 1, further comprising:
   (k) discriminating between acoustic signals generated by aquatic animals of different weights.

9. A process according to claim 1, further comprising:
   (l) monitoring feeding of said aquatic animals and wherein said aquatic animals comprise fish.

10. A process according to claim 9, further comprising:
(m) verifying that a density of an individual fish to be fed does not influence a frequency of noise generated by food intake of said individual fish.

11. A process according to claim 9, wherein said slaving further comprises:
effecting a detection of an acoustic signature of food uptake to determine a number of fish feeding during said step of dispensing feed; and
ending said dispensing when a number of fish feeding, as determined by said effecting, passes below a threshold number so as to economize a quantity of feed dispensed without penalizing a food demand expressed by said fish.

12. A process according to claim 9, further comprising:
(n) verifying that a density of fish does not modify the food uptake signal attributable to a single fish.

13. An acoustic detection device for implementing a process according to claim 1, comprising:
a hydrophone capable of extracting said acoustic signal from noise.

14. A device according to claim 13, further comprising:
a processing apparatus; and
means for automatically controlling said dispensing of feed as a function of a signal processed by said processing apparatus.

15. A device according to claim 14, wherein said processing apparatus comprises:
a system for carrying out digital processing of a signal originating from said hydrophone.

16. A device according to claim 15, wherein said processing apparatus further comprises:
an amplifier for amplifying a signal originating from said hydrophone.

17. A device according to claim 13, further comprising:
an acoustic signature detector.

* * * * *